March 24, 1931.    W. L. ORR    1,797,923
ANIMAL TRAP
Filed April 25, 1928
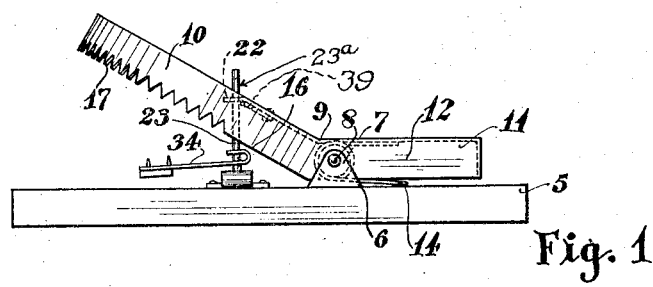
Fig. 1
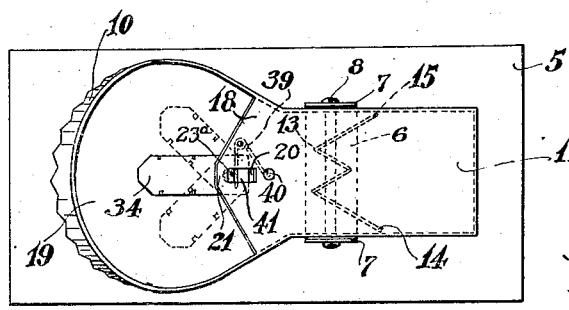
Fig. 2
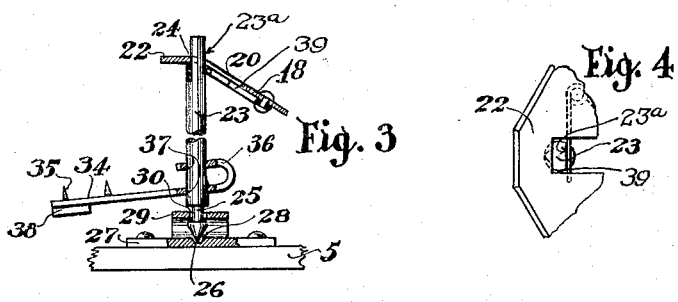
Fig. 3
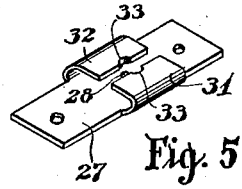
Fig. 4
Fig. 5
INVENTOR.
Walter L. Orr
BY
Brenda J. Mann
ATTORNEY.

Patented Mar. 24, 1931

1,797,923

UNITED STATES PATENT OFFICE

WALTER L. ORR, OF DENVER, COLORADO, ASSIGNOR OF ONE-HALF TO FRED B. ORR, OF CHICAGO, ILLINOIS

ANIMAL TRAP

Application filed April 25, 1928. Serial No. 272,649.

This invention relates in general to animal traps and more particularly to the type which are commonly called mouse traps, the principal objects of this invention being to provide an improved trap which is simple in construction, is readily and safely baited and set and is highly delicate and readily responsive to the light touch or nibbling of small animals such as mice, and while the invention is particularly useful in this connection it will be understood that the invention may be embodied in traps of larger size.

Further objects of this invention reside in the provision of an improved trap having a self cocking trigger or bait holder; the provision of a trap having an improved trigger adapted to automatically set the jaw upon angular displacement thereof and to release the jaw upon an angular or rotative movement of said trigger; the provision of an improved animal trap in which the friction in the moving parts, particularly the trigger, is reduced to a minimum so as to increase the sensitiveness of the mechanism; and the provision of an improved animal trap in which the moving parts may be formed as by stamping of rigid sheet metal, and, therefore, may be manufactured in large quantities at low cost.

The foregoing and such other objects and advantages as may appear or be pointed out as this description proceeds are attained in the structural embodiment illustrated in the accompanying drawing, in which:

Figure 1 is a side elevational view of the invention with the jaw set;

Figure 2 is a top plan view of the trap, and

Figures 3, 4 and 5 are views of details.

Referring now more particularly to the drawing and first to Figures 1 and 2, I provide a base 5 having a hinge bracket 6 fixedly secured thereto and provided with upturned spaced ears 7, 7, a hinge bolt 8 being arranged with its ends fixed in said ears.

The jaw of the trap is generally designated 9, and is preferably a stamping of rigid sheet metal having the angularly related jaw portion 10 and handle portion 11. The handle portion 11 is preferably substantially rectangular and box-like in form, the side walls 12 being pivoted at one end on the bolt 8. A coiled spring 13 surrounds the bolt and one end of the spring, indicated at 14, bears on the base 5, the other end of said spring indicated at 15 bears on the under surface of the handle portion 11, tending to force the jaw into closed position. The jaw is in the nature of a circular flange having the under edge 16 thereof provided with a plurality of teeth 17 so that when the jaw moves toward the base 5 into closed position the animal will be grasped between said base and said jaw.

The flanged jaw 10 is open as will be seen in Fig. 1, and as will be seen in Fig. 2, the top portion of the handle 11 is extended into the jaw portion of the trap as indicated at 18 and angularly bent with the jaw into substantially the same plane as the jaw. This portion 18 terminates so as to provide an open top as indicated at 19 in the jaw to permit application of bait to the trigger or bail holder.

The extended portion 18 is provided with an elongated slot 20, through which the trigger extends. The outer portion 21 of said extension 18 being bent into a plane substantially parallel with the base when the jaw is set as indicated at 22 in Figures 1, 2 and 3, the slot extending into said bent portion 22.

The trigger construction is perhaps best shown in Figure 3 and preferably includes a staff portion 23 flattened on its rear side at 23a and having a notch 24 formed adjacent its upper end in its forward face, that is, on the side facing the jaw. This staff is provided with a reduced portion 25 at its lower end terminating in a pointed member 26, the base 5 being provided with a metallic plate 27 having a recess 28 for receiving said pointed member 26. Above the plate 27 there is provided a guard member 29 having an aperture 30 in which the reduced portion 25 of the staff 23 lies.

The guard 29 is preferably formed as best shown in Fig. 5 and includes the inwardly bent tongues 31, 32 whose inner adjacent edges are slightly spaced apart and provided with complemental recesses 33, 33 which form the aperture 30 referred to above. In manufacturing this structure, the staff is placed on the plate 27 and the tongues 31, 32 are then bent into position so that the recesses 33 will engage the reduced portion 25 of the staff and prevent its dislodgment, but permit of substantially uniform movement, that is, a movement both angular and rotatable with respect to the plate and guard. This plate and the staff carried thereby are disposed immediately below the slot 20. A bait holder 34 having upwardly struck teeth for holding bait is applied to the staff by providing spaced apertures in the bait holder and bending the same as indicated at 36 so that the staff passes through the apertures indicated at 37, and this bait holder is then soldered or otherwise fixedly secured to the staff. The outer end of the bait holder 34 may be provided, though not necessarily, with a lead weight 38, to tend to cause the staff to move toward the jaw, that is, toward the "front" of the trap.

The trigger thus provided will automatically engage the bent portion 22 at the forward end of the slot 20 when the jaw is open by depressing the handle portion 11. In order to insure the notch 24 engaging the bent portion 22, a coiled spring 39 may be fixedly secured at 40 to the underside of the extension 18 which has an arm 41 engaging the projecting flat surface of the trigger staff 23. This spring also insures that the trigger arm 23 will center properly and the bait holder therefore project longitudinally of the trap.

It will be observed that the bait may be applied to the bait holder 34 before the trap is set, and that after this has been done, the handle portion 11 is pressed either by the hand or foot against the base 5 which raises the extension 18 and the jaw 10 to the position shown in Figures 1 and 2. As the bent portion 22 passes the notch 24, the staff 23 under the force of gravity and the tendency of the spring arm 41 will automatically engage beneath the bent portion 22 and hold the jaw in open or set position as shown in Figures 1, 2 and 3. An inspection of Fig. 4 will show that the staff 23 has but a small portion thereof removed to form the notch 24 and that the staff will be quickly disengaged from holding the jaw open by either an angular rearward displacement of the staff by the animal pulling the bait holder by grasping the bait, or that the trigger staff will disengage the jaw upon a rotative movement of the bait holder in either direction, thus rotating the staff. It will thus be observed that the trap is highly sensitive to the touch of animals such as mice for the reason that by a slight movement either angularly or rotatably of the staff 23 will result in a release of the jaw, which, of course, then rapidly moves toward the base 5 under the action of the coiled spring 13.

Having thus described my invention and illustrated its use, what I claim as new and desire to secure by Letters Patent, is:

1. In a device of the character described, in combination, a base, a jaw member hinged with respect to said base, a trigger pivoted on said base for holding said jaw in open position, said trigger including a staff portion passing through a slot in said jaw member, a notch in said staff to engage the edge of said slot, a bait portion on said staff, said staff being mounted for angular and rotative displacement relatively to said jaw member.

2. In a device of the character described, in combination, a base, a hinged jaw member and a trigger pivoted on said base for holding said jaw in set position mounted for angular displacement in a plane perpendicular to the hinge of said jaw member, a portion of said trigger extending through and having a notch therein forming a shoulder engaging said jaw member.

3. In a device of the character described, in combination, a base member, a hinged jaw member and a trigger pivoted on said base and having a fixed shoulder for holding said jaw in set position and extending through a portion of and engaging said jaw, said trigger being adapted to release the jaw upon either an angular or rotative movement of said trigger.

4. In a device of the character described, in combination, a base, a jaw member hinged with respect to said base, and a trigger rotatively mounted perpendicularly of the base and having a fixed shoulder for holding the jaw in set position, said trigger being constructed and arranged to automatically rotate to cause said shoulder to engage and hold the jaw in set position upon an angular displacement of said jaw in one direction.

5. In a device of the character described, in combination, a hinged jaw member having an extended portion provided with an aperture, a trigger for holding said jaw member in set position, said trigger extending through its aperture and being provided with a shoulder adapted to engage one edge of the aperture, said trigger being capable of rotative and angular displacement, and means on the jaw member adjacent to said trigger for maintaining said trigger in position with said shoulder engaging said extended portion.

6. In a device of the character described, in combination, a hinged jaw member having an extended portion provided with an aperture, a trigger for holding said jaw member in set position, said trigger extending through its aperture and being provided with a shoulder adapted to engage one edge of the aperture, said trigger being capable of rotative and angular displacement, yieldingly resistant means engaging said trigger to urge the same into engagement with the edge of said aperture and a bait-holder carried by said trigger, a rotative or angular movement of said trigger removing said shoulder from such engagement and releasing said jaw.

7. In a trap, in combination, a hinged jaw member and a trigger for holding said jaw member in set position and extending through a portion of and engaging said jaw member, a bait holder on said trigger, said bait holder extending angularly from the lower portion of said trigger, said trigger being adapted to release the jaw member upon either an angular or rotative movement of said bait member.

8. In a trap, in combination, a hinged jaw member and a trigger for holding said jaw member in set position and extending through a portion of and engaging said jaw member, a bait holder on said trigger, said trigger being adapted to release the jaw member only upon either an upward angular displacement of said bait holder or a rotative displacement of the latter.

In testimony whereof I have hereunto signed my name.

WALTER L. ORR.